(12) United States Patent
Herron (10) Patent No.: US 6,709,068 B2
(45) Date of Patent: Mar. 23, 2004

(54) AUTOMATIC SET AND RELEASE HAND BRAKE PNEUMATIC CIRCUIT DESIGN II/ AUTOMATIC APPLICATION FUNCTION

(75) Inventor: Robert A. Herron, Charleston, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/201,888

(22) Filed: Jul. 24, 2002

(65) Prior Publication Data

US 2003/0034689 A1 Feb. 20, 2003

(51) Int. Cl.[7] .................... B60T 13/70; B60T 15/16
(52) U.S. Cl. .................. 303/13; 303/15; 188/33; 188/107
(58) Field of Search ................. 303/13, 9, 7, 15, 303/71, 9.76; 188/33, 107, 105, 153 R, 170; 74/505, 504

(56) References Cited

U.S. PATENT DOCUMENTS

| | | | |
|---|---|---|---|
| 6,179,093 B1 * | 1/2001 | Daugherty, Jr. | 188/33 |
| 6,364,428 B1 * | 4/2002 | Labriola et al. | 303/13 |
| 6,394,233 B1 * | 5/2002 | Kanjo et al. | 188/1.11 R |
| 6,397,978 B1 * | 6/2002 | Jackson et al. | 188/33 |
| 6,578,679 B2 * | 6/2003 | Hill et al. | 188/170 |
| 2003/0034689 A1 * | 2/2003 | Herron | 303/13 |
| 2003/0075399 A1 * | 4/2003 | Ring et al. | 188/153 R |
| 2003/0111897 A1 * | 6/2003 | Ring et al. | 303/15 |

* cited by examiner

Primary Examiner—Douglas C. Butler
(74) Attorney, Agent, or Firm—James Ray & Associates (57) ABSTRACT

An apparatus comprising an operating mechanism having at least a portion thereof engageable with at least one gear of a gear assembly disposed in a housing member of a hand brake assembly for operating such gear assembly. A source of fluid pressure is connected to the operating mechanism for periodically supplying a pressure to such operating mechanism. A control device is connected to the source of pressure for initiating the supply of such pressure to the operating mechanism. A further control device is connected to the source of pressure for regulating the supply of such pressure to the operating mechanism thereby causing an automatic application of such brake by the hand brake assembly. An additional control device is connected to the source of pressure for stopping an automatic application of such brake in case of an emergency or a reversal of an unintended activation.

20 Claims, 6 Drawing Sheets

AUTOMATIC SET AND RELEASE HAND BRAKE PNEUMATIC CIRCUIT DESIGN II/ AUTOMATIC APPLICATION FUNCTION

CROSS-REFERENCES TO RELATED APPLICATIONS

This application is related to co-pending U.S. Ser. No. 09/507,227 entitled "Automatic Application Hand Brake", filed with the U.S. Patent Office on Feb. 18, 2000 and U.S. Serial No. 60/313,235 entitled "Automatic Application Hand Brake Winding Mechanism", filed with the U.S. Patent Office on Aug. 17, 2001. The disclosures of these co-pending applications are hereby incorporated by reference thereto.

FIELD OF THE INVENTION

The present invention relates, in general, to hand brake assemblies for use on railway type vehicles and, more particularly, this invention relates to an apparatus to automatically activate and apply the brakes on such railway vehicle without requiring an operator to manually wind the chain on such hand brake.

BACKGROUND OF THE INVENTION

Prior to the conception and development of the present invention, railway car hand brake mechanisms were well known in the art. They usually include a large, rotatable hand wheel disposed in a vertical plane and mounted on a shaft which, through a gear train, can rotate a chain drum to wind up a chain that is secured at its end remote from the chain drum to the brake rigging of the railway car. As the hand wheel is rotated in one direction, the brakes are applied and rotation of the hand wheel shaft in the opposite direction is prevented by a pawl which engages a detent wheel on the hand wheel shaft.

The brakes may be released by disengaging the pawl from the detent wheel but this causes rapid rotation of the hand wheel and the gears of the gear train. To avoid rapid rotation of the hand wheel, hand brake mechanisms have been devised which are known as "quick release" mechanisms. Generally these quick release mechanisms include a releasable connecting means between the hand wheel shaft and the gear train. When the connecting means is released, the gears of the gear train rotate rapidly, without constraint by the pawl and detent wheel, but the hand wheel remains stationary.

The Association of American Railroads (AAR) promulgates specifications for the design and operation of railway car hand brake mechanisms. Vertical wheel, gear train, hand brake mechanisms are classified in three categories, namely:

(1) Standard power—provides an average force on the chain of 3350 lbs. with a 125 lb. turning force applied to the rim of a wheel twenty-two inches in diameter.

(2) Intermediate power—provides an average force on the chain of 4475 lbs. with a 125 lb. turning force applied to the rim of a wheel twenty-two inches in diameter.

(3) High power—provides an average force on the chain of 6800 lbs. with a 125 lb. turning force applied to the rim of a wheel twenty-two inches in diameter.

After setting of the brakes, when the hand brake mechanism is released the gears of the gear train rotate rapidly. This results in the gears and other components being subjected to high forces and to shock, particularly, when the chain becomes fully let-out from the chain drum.

In recent times, the AAR has added a life cycle test to its specifications, and hand brake mechanisms which do not meet the life cycle test cannot be sold for use on railway cars operated in interchange service on United States railroads. The AAR life cycle test for quick release brakes requires that such latter brakes withstand 3000 quick release operations.

To meet such life cycle test requirements, even standard power hand brake mechanisms had to be modified when the life cycle test was adopted. When intermediate power hand brake mechanisms of the type sold prior to the adoption of the life cycle test were subjected to the life cycle test, it was found that the components thereof wore prematurely or were damaged, and it was found to be necessary to add a shock retarder, or absorber, external to the hand brake mechanism, to overcome such wear and damage. Of course, such an external shock retarder is undesirable not only because it is external to the hand brake mechanism but also because of the additional cost and because it requires field modification of the equipment on a railway car if the intermediate power hand brake mechanism is used to replace a standard power hand brake mechanism.

High power hand brake mechanisms sold prior to the adoption of, the life cycle test were similarly unable to pass the life cycle test. It should be borne in mind that such high power brake mechanisms normally have additional gears to provide the desired force on the chain, and this results in a higher speed of rotation of at least some of the gears during release of the hand brake mechanism.

Although the use of an external shock retarder might have solved the problems with the higher power hand brake mechanism, a change in the AAR specifications would have been required to permit the use of such an external shock retarder. Attempts were made to redesign the high power hand brake mechanism, such as by making it stronger, so that it would meet the life cycle test without the use of an external shock retarder, but the attempts were not successful.

One of the characteristics of railway car brakes with which the invention is concerned is that the force applied to the chain, and hence, the parts of the hand brake, is non-linear and depends on the extent to which the brakes are applied or released. Thus, as the brakes are applied, relatively little force is required to take up the slack in the chain and the brake rigging, but to meet AAR requirements, the final force on the chain must be as set forth herein before, namely, 3350 lbs. for a standard power brake, 4475 lbs. for an intermediate power brake and 6800 lbs. for a high power brake.

After slack in the rigging is taken up, which may require, for example, 5–15 inches of chain travel, the force on the chain increases exponentially, e.g. from 200 lbs. to the final value, as the brake hand wheel is further turned to set the brakes. In reaching the final value after the slack is taken up, the chain may travel only two or three inches. Similarly, when the hand brake is released, the chain force decreases exponentially and reaches a relatively small value shortly after the hand brake is released.

SUMMARY OF THE INVENTION

The present invention, according to a first aspect, provides an apparatus engageable with a hand brake assembly for automatically applying at least one brake means secured to a railway vehicle with such hand brake assembly. This apparatus includes an operating means having at least a portion thereof engageable with at least one gear of a gear assembly disposed in a housing member of such hand brake assembly. Such operating means operates such gear assembly in a direction which will cause an application of the at least one brake means. There is a source of fluid pressure connected to the operating means which periodically supplies a predetermined pressure to the operating means which is at least sufficient to cause the application of such at least one brake means. Further a means is connected to the source of fluid pressure for initiating the supply of predetermined pressure to the operating means thereby causing an automatic application of such at least one brake means by the hand brake assembly.

According to a second aspect, the present invention provides, in addition to the apparatus described above, a control means connected intermediate the operating means and the source of fluid pressure for controlling such predetermined pressure being periodically supplied to the operating means. Additionally, a venting means is connected to the operating means for venting the fluid pressure from such operating means.

In a third aspect, the present invention provides, in addition to the apparatus described above respect to the second aspect, a means connected intermediate the operating means and the control means for discontinuing the supply of the predetermined fluid pressure to the operating means thereby causing discontinuation of application of the at least one brake means.

OBJECTS OF THE INVENTION

It is, therefore, one of the primary objects of the present invention to provide an automatic application hand brake which provides a more reliable operation.

Another object of the present invention is to provide an automatic application hand brake which has incorporated therein an emergency shut-off means to stop automatic application of the hand brake.

Still another object of the present invention, is to provide an automatic application hand brake which can be retrofitted onto existing railway cars.

Yet another object of the present invention is to provide an automatic application hand brake which is relatively inexpensive to produce.

A further object to the present invention is to provide an automatic application hand brake which will exhibit a minimum of maintenance requirements.

An additional object of the present invention is to provide an automatic application hand brake which will meet the a AAR requirements for substantially all applications.

In addition to the various objects and advantages of the present invention which been described in some detail above it should be recognized that various other objects and advantages of the invention will become more readily apparent to those persons who are skilled in the relevant art from the following more detailed description of the invention, particularly, when such description is taken in conjunction with the attached drawing figures and with the appended claims.

BRIEF DESCRIPTION OF A PRESENTLY PREFERRED AND

VARIOUS ALTERNATIVE EMBODIMENTS OF THE PRESENT INVENTION

As can be seen from the above-discussion, from the discussion in the background the invention portion of this document, it would be advantageous to have an automatic application apparatus for applying the hand brake and thereby reduce the force required to apply the brakes. Aforementioned co-pending application Ser. No. 09/507,227 teaches an automatic application apparatus for applying, the hand brake which has several advantages over the currently used hand brake application devices. Aforementioned co-pending application serial No. 60/313,235 teaches an improved automatic application hand brake that meets all of the design input criteria for air usage not achievable in automatic application hand brake per Ser. No. 09/507,227.

However, based upon further data collected on the improved design of the automatic application hand brake of co-pending application serial No. 60/313,235 (hereby referred to as Design II), it was determined that the consistency of operation can be achieved with modifications of the pneumatic circuit. Furthermore, it was found advantageous to add an emergency shut-off means to stop automatic setting of the hand brake.

The automatic application hand brake of the present invention improves upon the Design II automatic application hand brake in that it improves reliability of the pneumatic circuit arrangement and incorporates an emergency shut-off means to stop automatic setting of the hand brake.

The following background information is provided to assist the reader to understand the environment in which the invention will typically be used. The terms used herein are not intended to be limited to any particular narrow interpretation unless specifically stated otherwise in this document.

Prior to proceeding to the more detailed description of the various embodiments of the present invention, for the sake of clarity and understanding of such invention, it should be noted that identical components having identical functions have been identified with identical reference numerals throughout each of the figures illustrated herein.

Figure 4:
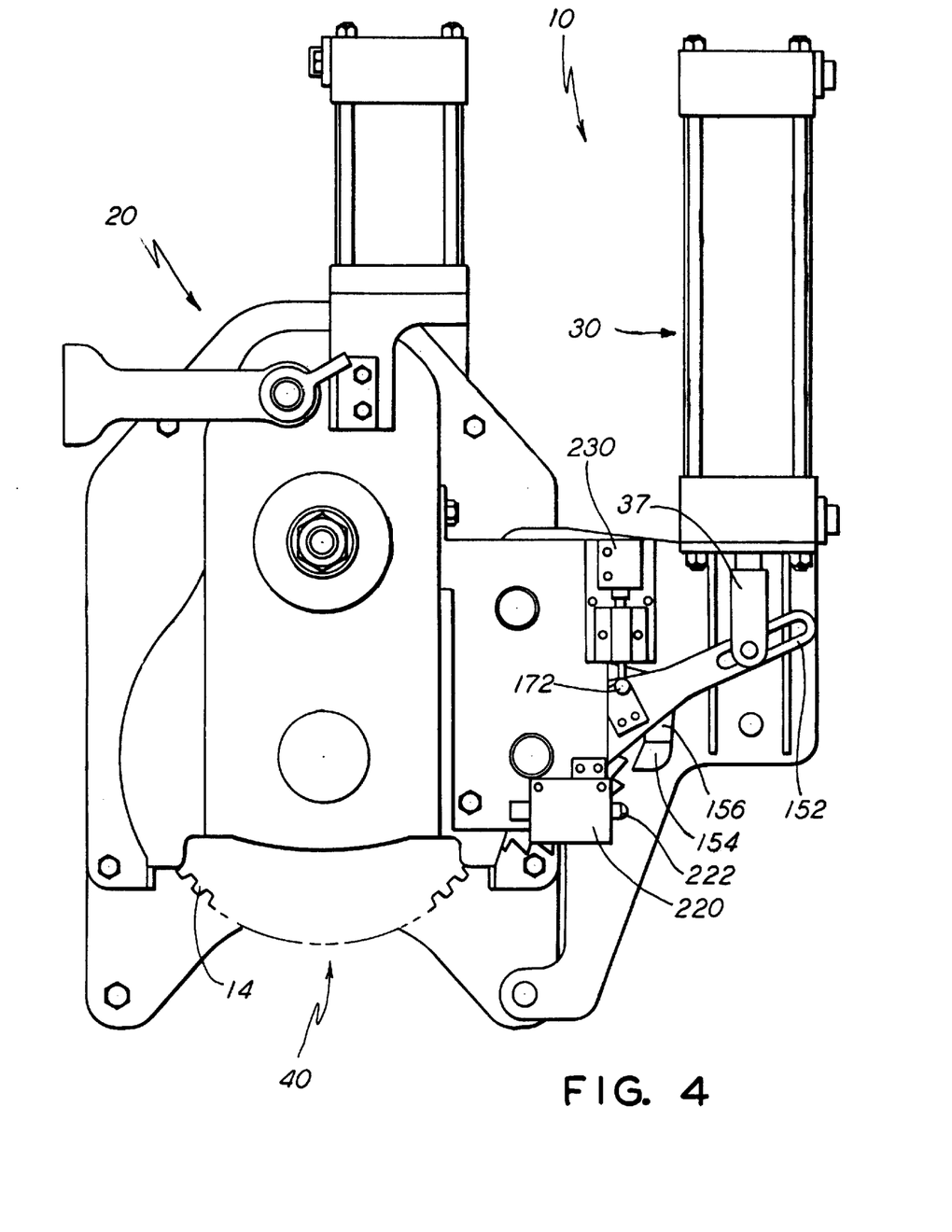
FIG. 4 is a front elevation view of a hand brake assembly incorporating a portion of the automatic application hand brake of the present invention, with the application cylinder in substantially retracted position
Figure 5:
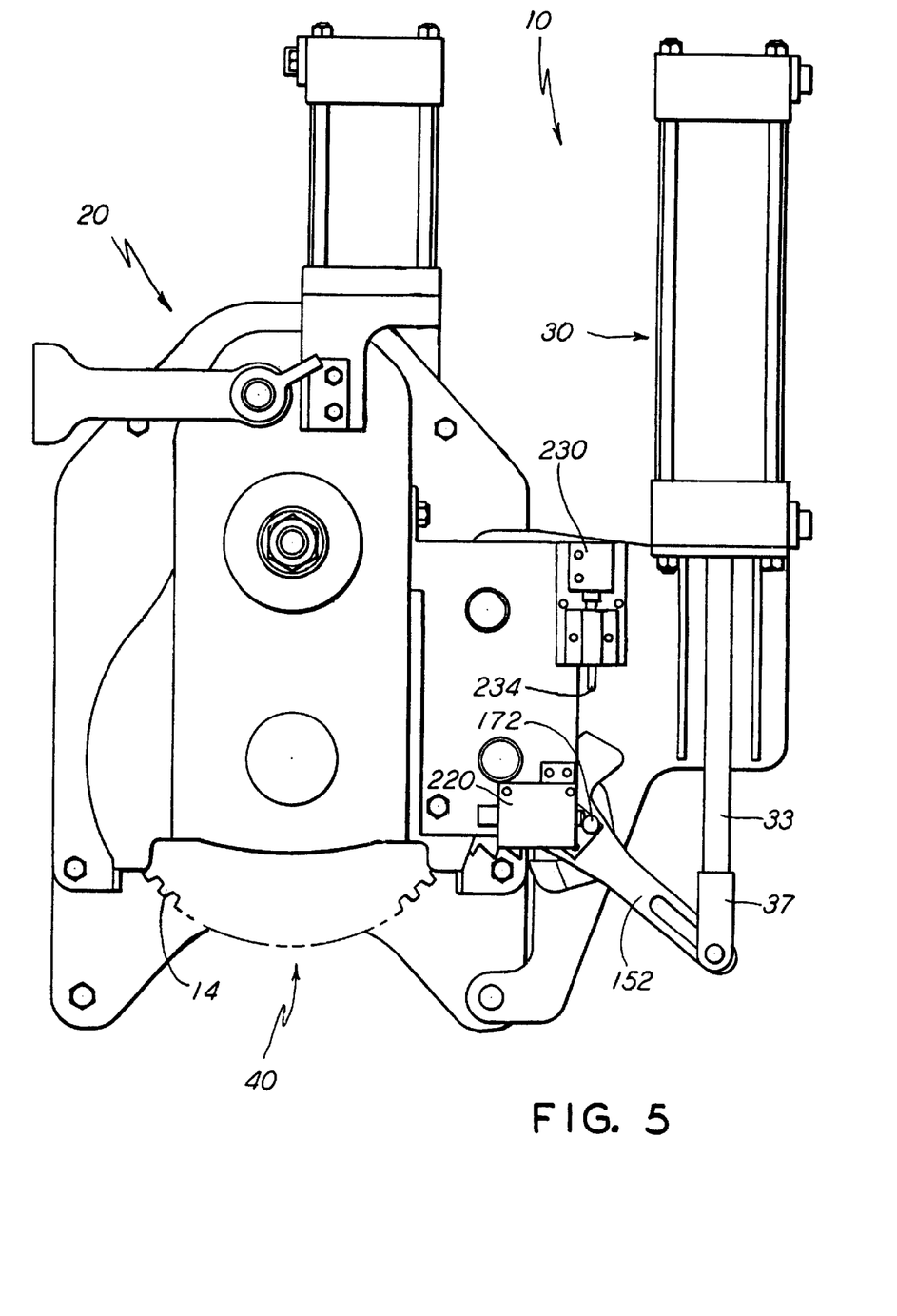
FIG. 5 is a front elevation view of a hand brake assembly incorporating a portion of the automatic application hand brake of the present invention, with the application cylinder in substantially extended position.

In reference to FIGS. 4 and 5, the automatic application hand brake of the invention comprises an operating means, generally designated 30, engageable with such hand brake. In the preferred embodiment this operating means includes a double acting cylinder having a drive rod 33 extending from one end. A first portion of the drive rod 33 is connected to a first portion of a drive arm 37. The second portion of such drive rod 33 is connected to a cylinder piston 32.

Furthermore, the second portion of the drive arm 37 is engageable with a lever 152.

At least one operating pawl 154 is pinned to the lever 152 and a spring means 156 is provided for urging the operating pawl 154 into contact with a ratchet 150. This ratchet 150 is engageable with at least one gear 14 of a hand brake gear assembly 40 disposed in a housing member of the hand brake assembly 20. Application of a force within the operating cylinder 30 causes the drive arm 37 to move outwardly from the cylinder 30 and apply a downward force to the lever 152 which causes the operating pawl 154 to engage a tooth within the ratchet member 150.

At least one return spring 34 is provided within the operating cylinder 30 to urge the drive arm 37 back to its original position. Rotation of the ratchet 150 causes the gear 14 of the hand brake gear assembly 40 to rotate in a direction which will cause an application of the brake means. Repeated applications of pressure within the operating cylinder 30 enables the gear of the hand brake gear assembly to rotate a sufficient amount to result in an application of the brakes.

Figure 6:
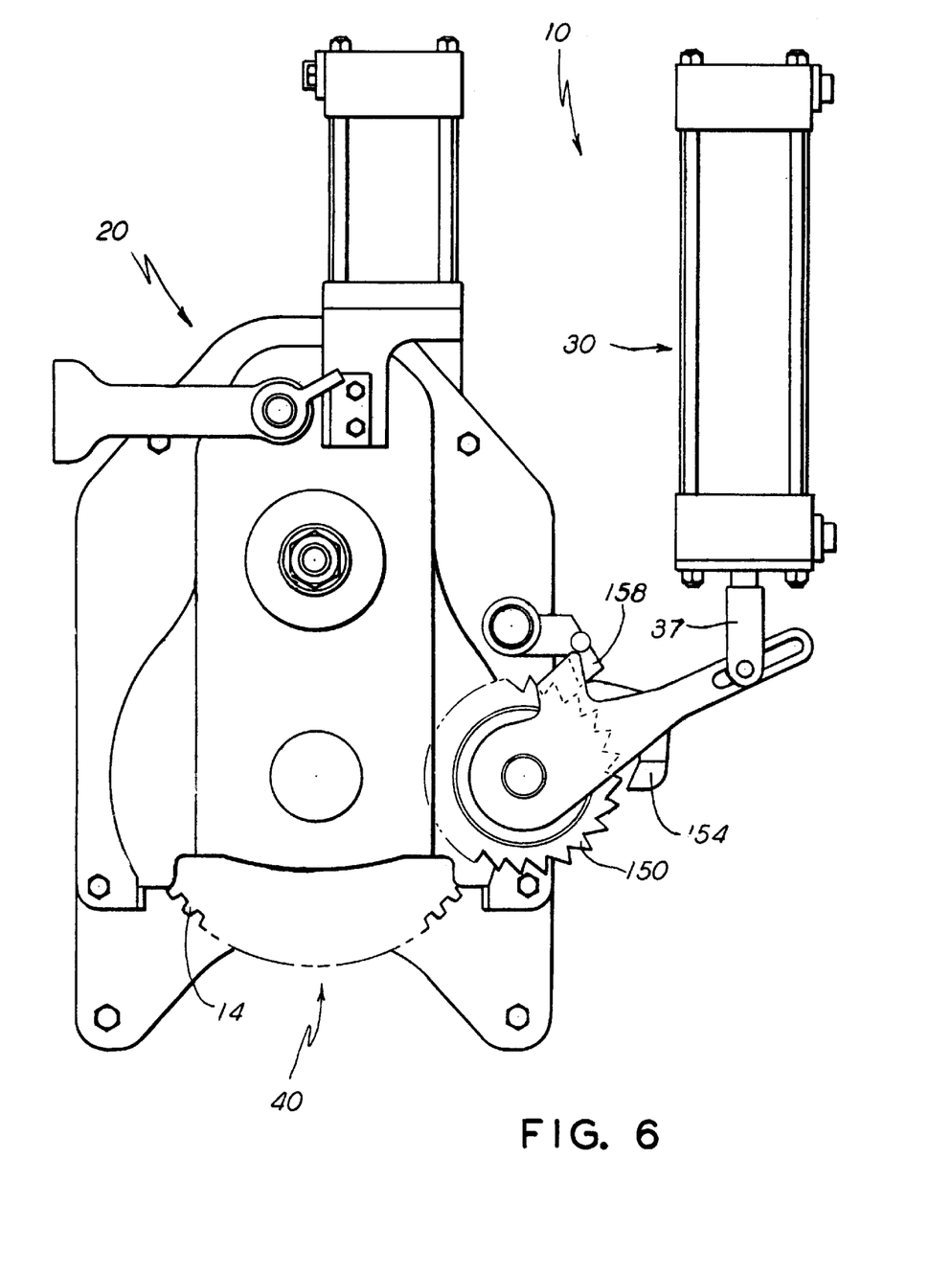
FIG. 6 is a cut-away view of a hand brake assembly incorporating a portion of the automatic application hand brake of the present invention, particularly showing the holding lock pawl of the present invention.

A holding pawl 158, best shown in FIG. 6; is also provided which cooperates with the ratchet 150. At least one control valve is engageable with the trigger 172 attached to lever 152 to control the operation of the operating cylinder 30. In the preferred embodiment this at least one control valve is a two control valve system cooperating with each other to provide reciprocating operation of the operating cylinder 30. This control valve system comprises a first reciprocating valve means 220 and a second reciprocating valve means 230.

At least one control valve means 240 is also provided to redirect the path of the fluid pressure to the rod end of the cylinder 30 and aid a return spring 34 in completely returning the piston 32 to its fully returned position. Furthermore, at least one control valve means 250 is provided for stopping an automatic application of the hand brake in case of the emergency of reversal of the unintended operation. Finally, valve means 280 is provided in the preferred embodiment to quickly exhaust fluid pressure from the operating cylinder 30 to atmosphere. Alternatively, such valve means can be simply pipes of the predetermined diameter to regulate the flow of the fluid pressure. Additionally, valve means 200, 210, 220, 230 and 240 can be operated by a variety of power means such as manual, mechanical, electrical, electronic or pneumatic.

Figure 1:
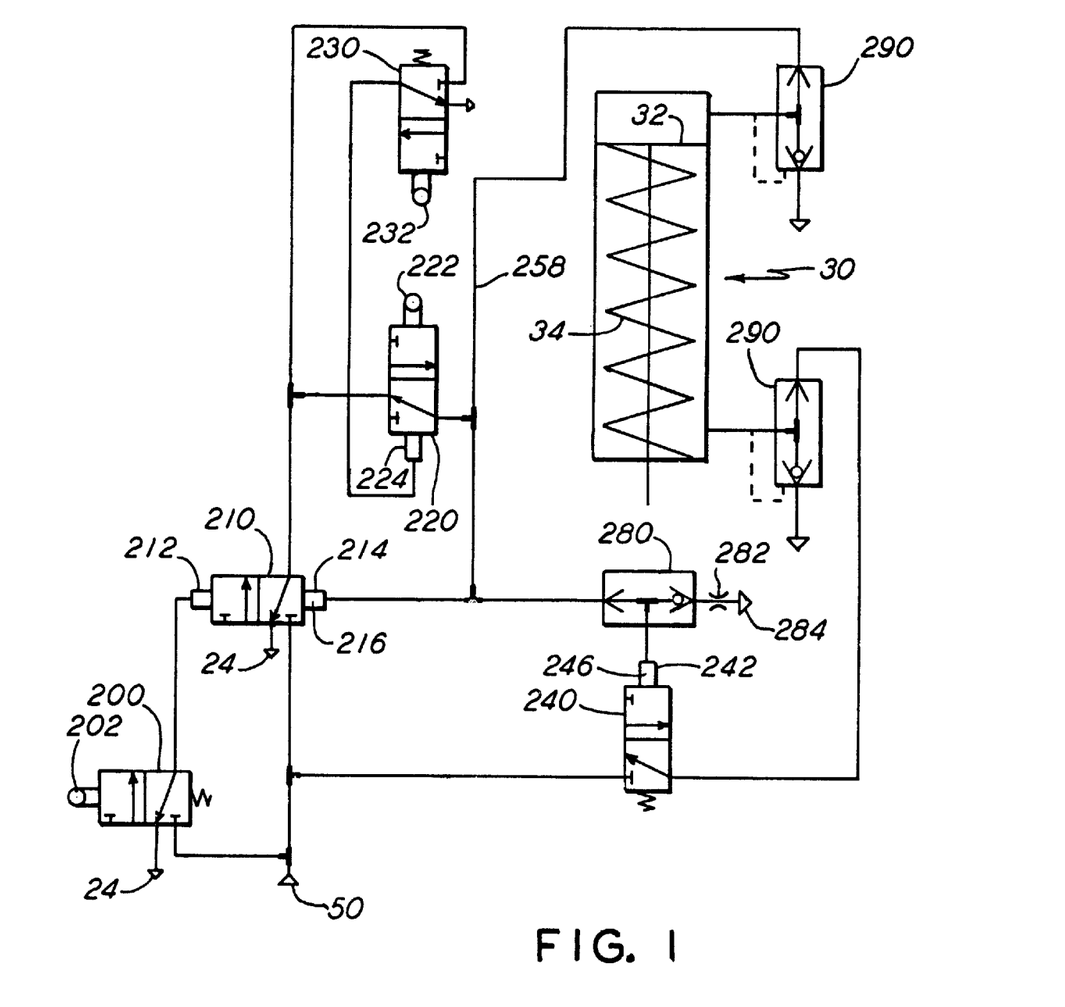
FIG. 1 is a schematic illustration of the presently preferred operating mechanism for use with the presently disclosed automatic activation hand brake winding mechanism.

Refer now, more particularly to FIG. 1. Assume we've got a steady state condition where the cylinder piston 32 is completely returned by it's spring 34. Consequently, there is no air pressure behind the piston 32, and to start an application all that is required is to activate pushbutton 202 attached to application valve member 200 which begins the whole process in order to wind up the brake. It allows a source of fluid pressure 50 from an emergency reservoir (not shown) to flow through said valve 200 and into pilot 212 attached to activation valve 210.

The presently preferred fluid pressure is pneumatic. The build-up of the pressure in the pilot 212 to a predetermined value causes valve 210 to open and allow fluid pressure 50 to flow through such valve 210 to a first reciprocating valve a 220 and a second reciprocating valve 230. In further reference to FIG. 4, first trigger 170 engages the pushbutton 232 attached to valve 230 and allows fluid pressure 50 to flow through such valve 230 into pilot 224 attached to first reciprocating valve 220.

The predetermined pressure in the pilot 224 will cause the valve 220 to shift and allow fluid pressure 50 to flow through the valve 220 in four directions. The primary directions of the fluid pressure will be to the backside of the piston 32, causing the piston 32 to now drive the rod 33 down pushing the air back out of the cylinder to atmosphere 284 through quick exhaust valve 290 and, more importantly, rotating lever 152 in a clock-wise direction, causing the hand brake 20 to wind up.

Additionally, when the load is fully applied, the fluid pressure will flow to the pilot 214 attached to the activation valve 210 causing the valve 210 to shift into the vented position and cut-off fluid pressure supply 50 from the emergency reservoir. Furthermore, the fluid pressure will flow through the quick exhaust valve 280 to the pilot 242 attached to the change-over valve 242, causing such valve 240 to shift and allow fluid pressure supply 50 to flow to the front side of the piston 32 further aiding its return to the original position.

Yet additionally, the fluid pressure will be exhausted to atmosphere 284 through choke 282. In the preferred embodiment, the choke 282 is of a regulating type to apply predetermined fluid pressure to the pilot 242.

Once the piston 32 reaches the bottom of its stroke, the trigger 172 will activate pushbutton 222 attached to the first reciprocating valve 220, closing such valve 220. Furthermore, the return spring 34 is going to drive the piston 32 to its original position pushing the air back out of the cylinder to atmosphere 284 through quick exhaust valve 290. The trigger 172 engages pushbutton 232, opening valve 230, which is going to cause air to go back into the cylinder again. The apparatus 10 will continue this cycle until the hand brake 20 is completely wound up to achieve a load of about 3350 lbs. Upon achieving his load, the pressure in the line between valve 220 and valve 290 will increase causing valve 210 to shift and vent to atmosphere 24, but, more importantly, closing the supply of the fluid pressure 50. While at the same time, the predetermined pressure in the pilot 242 will cause valve 240 to shift allowing fluid pressure to flow to the bottom side of the cylinder 30 and cooperate with return spring 34 to disengage the holding pawl 158 thereby applying the holding pawl (not shown) within brake apparatus 20.

Figure 2:
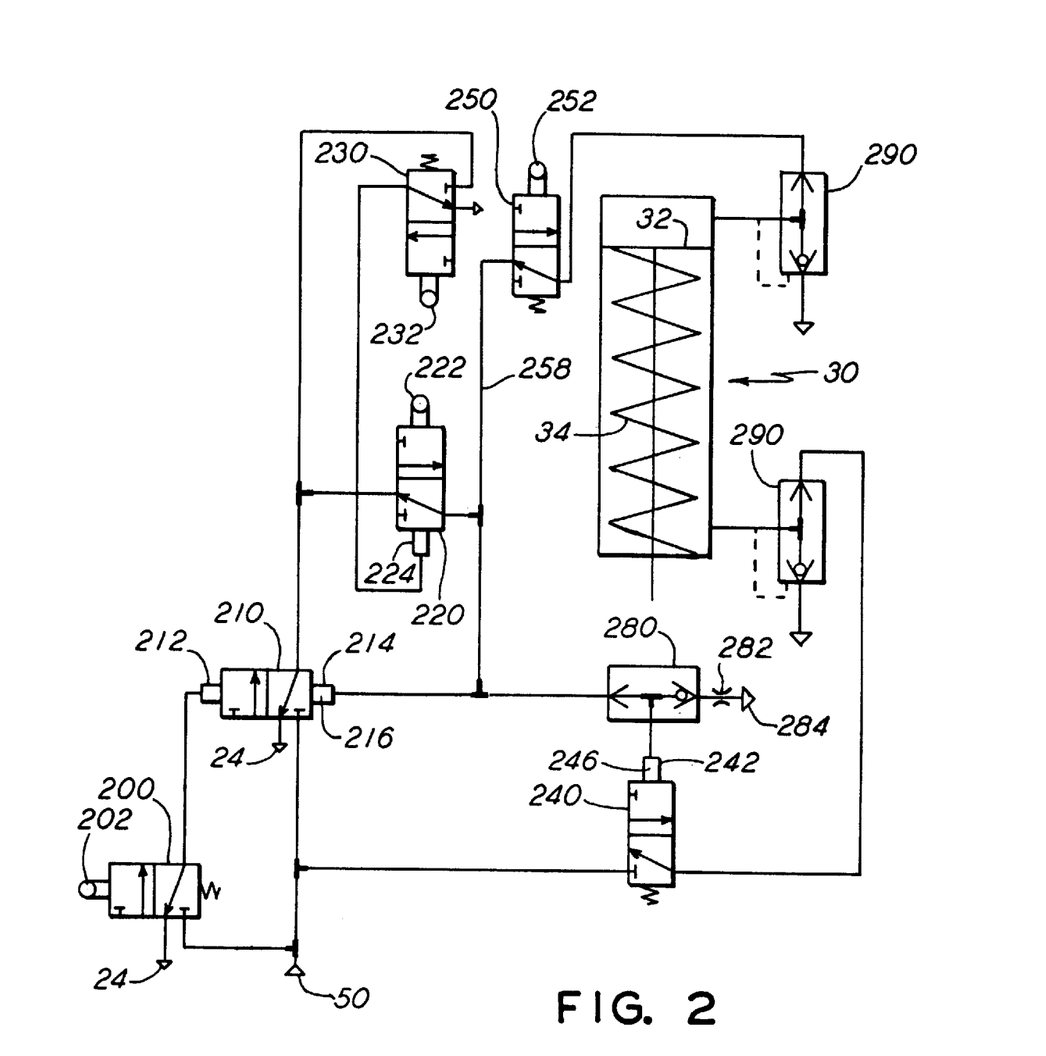
FIG. 2 is a schematic illustration of the presently preferred operating mechanism for use with the presently disclosed automatic activation hand brake winding mechanism, including emergency shut-off function.

The final element of the present invention will include means to shut-off automatic application of the hand brake to reverse braking action or misintented brake application. In further reference to FIG. 2, these means include at least one valve 250 connected in-line between first reciprocating valve 220 and operating cylinder 30. The valve 250 is preferably activated by a push button 252 and has a spring return means 254. Such valve 250 upon activation of pushbutton 252 will close the flow of fluid pressure to the operating cylinder 30 during automatic application causing the line between the valve 250 and operating cylinder 30 to be exhausted to atmosphere through such valve 250. At the same time, the fluid pressure in the line 258 between first reciprocating valve 220 and emergency shut-off valve 250 will increase to a predetermined pressure greater than the pressure 216 inside the pilot 214 and pressure 246 inside the pilot 242 causing first reciprocating valve 220 to shift and closing off the fluid pressure supply 50 to the application circuit.

Alternatively, the emergency shut-off means may be incorporated into an application valve to reduce the number of valves in the application circuit, when the particular brake system does not require all available capacity provided by the hand brake activating means 10. As illustrated in the FIG. 3, valve 260 provides such function. The valve 260 is pulled for an automatic application function and pushed for the emergency shut-off function.

Figure 3:
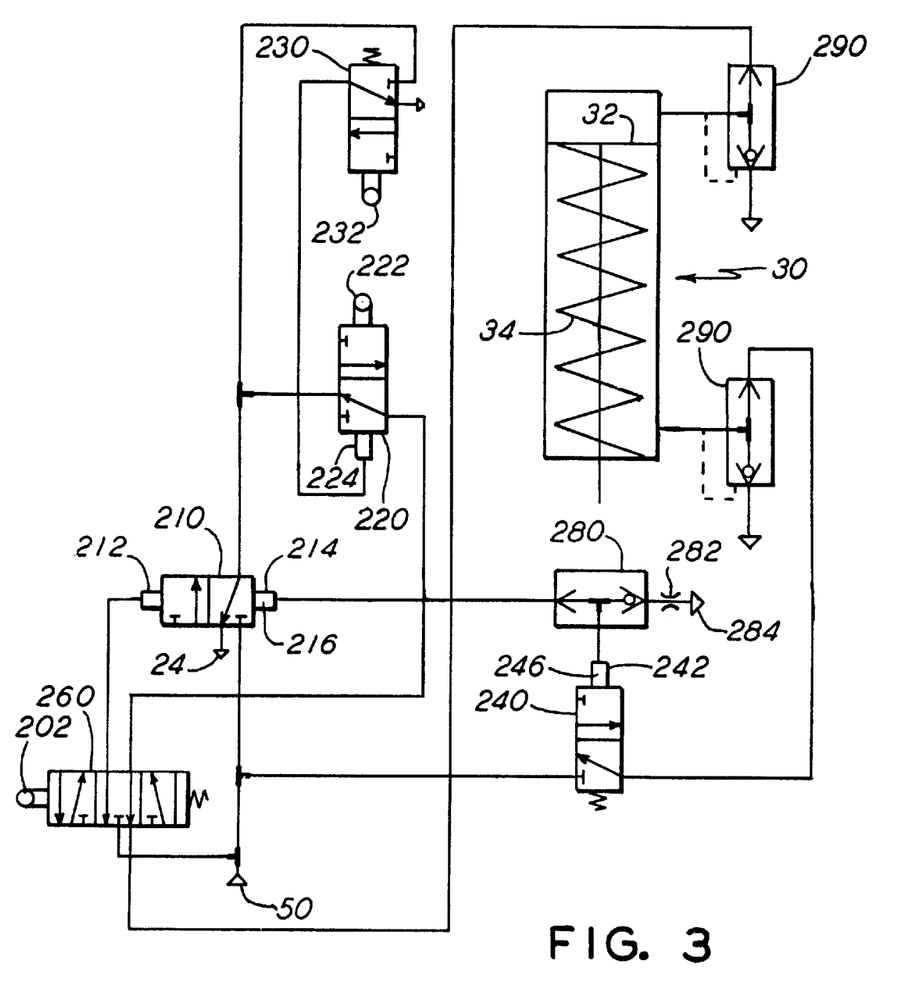
FIG. 3 is a schematic illustration of the presently preferred operating mechanism for use with the presently disclosed automatic activation hand brake winding mechanism, including emergency shut-off function integrated into an application valve.

Upon initiating the emergency shut-off function, valve 260 closes fluid pressure supply 50 to the operating cylinder 30 while over pressurizing the fluid pressure supply line 228 between the valve 220 and such valve 260 to a predetermined pressure greater than the pressure 216 inside the pilot 214 and pressure 246 inside the pilot 242 causing first reciprocating valve 220 to shift and closing off the fluid pressure supply 50 to the application circuit.

While the presently preferred embodiment and various additional alternative embodiments for carrying out the instant invention have been set forth in detail in accordance with the Patent Act, those persons skilled in the hand brake art to which this invention pertains will recognize various alternative ways of practicing the invention without departing from the spirit and scope of the appended claims.

Accordingly, to promote the progress of science and useful arts, we secure for ourselves by Letters Patents for a limited time exclusive rights to all subject matter embraced by the following claims.

This operating mechanism can be converted for use with the presently disclosed automatic activation hand brake winding mechanism. This operating mechanism is discussed in detail in co-pending application Serial No. 60/313,235 and co-pending application Ser. No. 09/507,227.

I claim:

1. An apparatus engageable with a hand brake assembly for automatically applying at least one brake means secured to a railway vehicle with such hand brake assembly, said apparatus comprising:
   (a) an operating means having at least a portion thereof engageable with at least one gear of a gear assembly disposed in a housing member of such hand brake assembly for operating such gear assembly in a direction which will cause an application of such at least one brake means;
   (b) a source of fluid pressure connected to said operating means for periodically supplying a predetermined pressure to said operating means at least sufficient to cause such application of such at least one brake means; and
   (c) a means connected to said source of fluid pressure for initiating said supply of said predetermined pressure to said operating means thereby causing an automatic application of such at least one brake means by such hand brake assembly.

2. An apparatus for automatically applying at least one brake means secured to a railway vehicle with a hand brake assembly, according to claim 1, wherein said apparatus further includes a control means connected intermediate said operating means and said source of fluid pressure for controlling said predetermined pressure being periodically supplied to said operating means.

3. An apparatus for automatically applying at least one brake means secured to a railway vehicle with a hand brake assembly, according to claim 1, wherein said apparatus further includes means connected for venting said fluid pressure from said operating means.

4. An apparatus for automatically applying at least one brake means secured to a railway vehicle with a hand brake assembly, according to claim 1, wherein said apparatus further includes means connected intermediate said operating means for stopping said supply of said predetermined pressure to said operating means thereby causing discontinuation of applying at least one brake means.

5. An apparatus for automatically applying at least one brake means secured to a railway vehicle with a hand brake assembly, according to claim 1, wherein said operating means includes at least one valve means for connecting said source of fluid pressure to said operating means.

6. An apparatus for automatically applying at least one brake means secured to a railway vehicle with a hand brake assembly, according to claim 5, wherein said operating means includes a plurality of valve means for connecting said source of fluid pressure to said operating means.

7. An apparatus for automatically applying at least one brake means secured to a railway vehicle with a hand brake assembly, according to claim 5, wherein said apparatus further includes means for venting said fluid pressure from said at least one valve means.

8. An apparatus for automatically applying at least one brake means secured to a railway vehicle with a hand brake assembly, according to claim 6, wherein said apparatus further includes means for venting said fluid pressure from said plurality of valve means.

9. An apparatus for automatically applying at least one brake means secured to a railway vehicle with a hand brake assembly, according to claim 1, wherein said source of fluid pressure is pneumatic.

10. An apparatus for automatically applying at least one brake means secured to a railway vehicle with a hand brake assembly, according to claim 1, wherein said means for initiating said supply of said predetermined pressure to said operating means is at least one of a push button, a pneumatic signal, an electrical signal, a real frequency signal and an electric signal.

11. An apparatus for automatically applying at least one brake means secured to a railway vehicle with a hand brake assembly, according to claim 1, wherein said apparatus further includes a control valve means to redirect the pressure fluid supply to the opposite side of the operating means.

12. An apparatus for automatically applying at least one brake means secured to a railway vehicle with a hand brake assembly, according to claim 11, wherein means are provided to control pressure fluid supply to a predetermined level in order to activate said control valve means to redirect the pressure fluid supply to the opposite side of the operating means.

13. An apparatus for automatically applying at least one brake means secured to a railway vehicle with a hand brake assembly, according to claim 1, said apparatus further includes means for venting said fluid pressure form said operating means upon reversal of said operating means.

14. An apparatus for automatically applying at least one brake means secured to a railway vehicle with a hand brake assembly, according to claim 13, wherein said venting means is one of at least one quick exhaust valve, a plurality of quick exhaust valves and a fluid pressure line having a predetermined diameter.

15. An apparatus engageable with a hand brake assembly for automatically applying at least one brake means secured to a railway vehicle with such hand brake assembly, said apparatus comprising:
   (a) an operating means having at least a portion thereof engageable with at least one gear of a gear assembly disposed in a housing member of such hand brake assembly for operating such gear assembly in a direction which will cause an application of such at least one brake means;
   (b) a source of fluid pressure connected to said operating means for periodically supplying a predetermined pressure to said operating means at least sufficient to cause such application of such at least one brake means;
   (c) a means connected to said source of fluid pressure for initiating said supply of said predetermined pressure to said operating means thereby causing an automatic application of such at least one brake means by such hand brake assembly;

(d) a control means connected intermediate said operating means and said source of fluid pressure for controlling said predetermined pressure being periodically supplied to said operating means;

(e) a venting means connected to said operating means for venting said fluid pressure from said operating means.

16. An apparatus for automatically applying at least one brake means secured to a railway vehicle with a hand brake assembly, according to claim 15, wherein said operating means includes a plurality of valve means for connecting said source of fluid pressure to said operating means.

17. An apparatus for automatically applying at least one brake means secured to a railway vehicle with a hand brake assembly, according to claim 15, wherein said apparatus further includes means for venting said fluid pressure from said plurality of valve means.

18. An apparatus engageable with a hand brake assembly for automatically applying at least one brake means secured to a railway vehicle with such hand brake assembly, said apparatus comprising:

(a) an operating means having at least a portion thereof engageable with at least one gear of a gear assembly disposed in a housing member of such hand brake assembly for operating such gear assembly in a direction which will cause an application of such at least one brake means;

(b) a source of fluid pressure connected to said operating means for periodically supplying a predetermined pressure to said operating means at least sufficient to cause such application of such at least one brake means;

(c) a means connected to said source of fluid pressure for initiating said supply of said predetermined pressure to said operating means thereby causing an automatic application of such at least one brake means by such hand brake assembly;

(d) a control means connected intermediate said operating means and said source of fluid pressure for controlling said predetermined pressure being periodically supplied to said operating means;

(e) a venting means connected to said operating means for venting said fluid pressure from said operating means; and (f) a means connected intermediate of said operating means for discontinuing said supply of said predetermined fluid pressure to said operating means thereby causing discontinuation of applying at least one brake means.

19. An apparatus for automatically applying at least one brake means secured to a railway vehicle with a hand brake assembly, according to claim 18, wherein said means for stopping supply of said fluid pressure to said operating means is a valve means connected intermediate said operating means and said source of said predetermined fluid pressure.

20. An apparatus for automatically applying at least one brake means secured to a railway vehicle with a hand brake assembly, according to claim 18, wherein said means for stopping supply of said fluid pressure to said operating means is a valve means integrated with activating means and connected intermediate of said operating means and source of said predetermined fluid pressure to said operating means.

* * * * *